United States Patent
Georgin et al.

(10) Patent No.: US 11,999,468 B2
(45) Date of Patent: *Jun. 4, 2024

(54) HYBRID BRAKE SYSTEMS AND METHODS

(71) Applicant: GOODRICH CORPORATION, Charlotte, NC (US)

(72) Inventors: Marc Georgin, Dayton, OH (US); Richard A. Poisson, Avon, CT (US)

(73) Assignee: GOODRICH CORPORATION, Charlotte, NC (US)

(*) Notice: Subject to any disclaimer, the term of this patent is extended or adjusted under 35 U.S.C. 154(b) by 139 days.

This patent is subject to a terminal disclaimer.

(21) Appl. No.: 17/668,987

(22) Filed: Feb. 10, 2022

(65) Prior Publication Data
US 2023/0249808 A1    Aug. 10, 2023

(51) Int. Cl.
| | |
|---|---|
| *B64C 25/44* | (2006.01) |
| *B60T 8/17* | (2006.01) |
| *B60T 8/88* | (2006.01) |
| *B60T 8/92* | (2006.01) |
| *B64D 45/00* | (2006.01) |

(52) U.S. Cl.
CPC .......... *B64C 25/44* (2013.01); *B60T 8/1703* (2013.01); *B60T 8/885* (2013.01); *B60T 8/92* (2013.01); *B60T 2270/402* (2013.01); *B60T 2270/406* (2013.01); *B64D 2045/0085* (2013.01)

(58) Field of Classification Search
CPC .......... B64F 5/60; B60T 8/325; B60T 8/1703; B60T 13/662
See application file for complete search history.

(56) References Cited

U.S. PATENT DOCUMENTS

| | | | |
|---|---|---|---|
| 2,888,101 | A | 5/1959 | Bayles |
| 4,043,607 | A | 8/1977 | Signorelli et al. |
| | | (Continued) | |

FOREIGN PATENT DOCUMENTS

| | | |
|---|---|---|
| CN | 104859626 | 7/2017 |
| CN | 109027064 | 12/2018 |
| | (Continued) | |

OTHER PUBLICATIONS

USPTO; Non-Final Office Action dated Apr. 7, 2023 in U.S. Appl. No. 17/393,311.

(Continued)

*Primary Examiner* — John Kwon
(74) *Attorney, Agent, or Firm* — SNELL & WILMER L.L.P.

(57) ABSTRACT

A braking system for an aircraft is disclosed herein. The braking system may comprise: a brake assembly; a hydraulic braking subsystem having a hydraulic brake actuator configured to operate the brake assembly; an electric braking subsystem and a hydraulic braking subsystem. During a flight, one of the electric braking subsystem and the hydraulic braking subsystem may be selected as a primary braking system. The braking system may be configured to command braking of a brake assembly by the hydraulic braking subsystem and the electric braking subsystem during an RTO phase of the flight. The braking system may be configured to command braking of a brake assembly by a secondary braking system in response to a failure of a primary braking system during the RTO phase of the flight.

20 Claims, 8 Drawing Sheets

(56) References Cited

U.S. PATENT DOCUMENTS

| | | | |
|---|---|---|---|
| 5,704,693 | A | 1/1998 | Mackiewicz |
| 6,345,225 | B1 | 2/2002 | Bohm et al. |
| 6,634,221 | B2 | 10/2003 | Harris et al. |
| 6,932,438 | B2 | 8/2005 | Maron |
| 7,614,340 | B2 | 11/2009 | Steinke et al. |
| 9,254,913 | B2 | 2/2016 | Drennen et al. |
| 9,434,369 | B1 | 9/2016 | Georgin et al. |
| 9,783,171 | B2 | 10/2017 | Singh |
| 9,829,402 | B2 | 11/2017 | Beason et al. |
| 10,131,329 | B1* | 11/2018 | Georgin ............... B60T 8/174 |
| 10,427,665 | B2 | 10/2019 | Mastrocola et al. |
| 10,435,005 | B2 | 10/2019 | Abbott |
| 10,458,497 | B2 | 10/2019 | Poisson |
| 10,752,230 | B2 | 8/2020 | Georgin et al. |
| 10,800,387 | B1 | 10/2020 | Georgin |
| 2003/0010583 | A1 | 1/2003 | Arnold et al. |
| 2003/0029680 | A1 | 2/2003 | Ralea et al. |
| 2008/0116740 | A1 | 5/2008 | Yokoyama et al. |
| 2008/0283346 | A1 | 11/2008 | Ralea |
| 2010/0286881 | A1 | 11/2010 | Cahill |
| 2011/0040466 | A1 | 2/2011 | Cahill |
| 2011/0156472 | A1 | 6/2011 | Bucheton et al. |
| 2013/0276510 | A1 | 10/2013 | Valdevit et al. |
| 2013/0299286 | A1 | 11/2013 | Tanty |
| 2013/0341134 | A1 | 12/2013 | Chico |
| 2014/0156160 | A1 | 6/2014 | DeVlieg et al. |
| 2015/0291280 | A1 | 10/2015 | Iordanidis et al. |
| 2016/0001753 | A1 | 1/2016 | Georgin et al. |
| 2016/0223415 | A1 | 8/2016 | Beason et al. |
| 2016/0377134 | A1 | 12/2016 | Poisson |
| 2017/0267337 | A1 | 9/2017 | Georgin |
| 2018/0099650 | A1 | 4/2018 | Jones et al. |
| 2019/0077500 | A1 | 3/2019 | Kipp et al. |
| 2019/0248478 | A1 | 8/2019 | Crane et al. |
| 2019/0263510 | A1 | 8/2019 | Bill et al. |
| 2019/0322253 | A1 | 10/2019 | Arsenault et al. |
| 2020/0339083 | A1 | 10/2020 | Bill |
| 2022/0097832 | A1* | 3/2022 | Georgin ............... B64C 25/44 |
| 2023/0249807 | A1* | 8/2023 | Georgin ............... B60T 13/662 |
| | | | 701/70 |
| 2023/0249808 | A1* | 8/2023 | Georgin ............... B60T 8/885 |
| | | | 701/70 |
| 2023/0249846 | A1* | 8/2023 | Georgin ............... B60T 13/662 |
| | | | 188/1.11 L |

FOREIGN PATENT DOCUMENTS

| | | |
|---|---|---|
| DE | 69103215 | 12/1994 |
| EP | 0247253 | 12/1987 |
| EP | 2724908 | 4/2014 |
| EP | 3112232 | 1/2017 |
| JP | 2020050205 | 4/2020 |
| WO | 2019188141 | 10/2019 |
| WO | 2021204833 | 10/2021 |

OTHER PUBLICATIONS

USPTO; Final Office Action dated Jul. 6, 2023 in U.S. Appl. No. 17/393,311.

European Patent Office, European Partial Search Report dated May 22, 2023 in Application No. 23152932.2.

European Patent Office, European Search Report dated May 25, 2023 in Application No. 23156128.3.

European Patent Office, European Partial Search Report dated May 23, 2023 in Application No. 23153531.1.

European Patent Office; Extended European Search Report dated Feb. 3, 2022 in Application No. 21199890.1.

European Patent Office; European Office Action dated Jan. 20, 2023 in Application No. 21199890.1.

USPTO; Non-Final Office Action dated Dec. 19, 2023 in U.S. Appl. No. 17/393,311.

European Patent Office; European Office Action dated Nov. 10, 2023 in Application No. 21199890.1.

European Patent Office, European Search Report dated Aug. 29, 2023 in Application No. 23152932.2.

European Patent Office, European Search Report dated Aug. 29, 2023 in Application No. 23153531.1.

USPTO; Notice of Allowance dated Jan. 22, 2024 in U.S. Appl. No. 17/668,647.

\* cited by examiner

HYBRID BRAKE SYSTEMS AND METHODS

FIELD

The present disclosure relates to aircraft wheel and brake systems and, more particularly, to systems and methods for enhancing rejected take off response in aircraft wheel and brake systems.

BACKGROUND

Aircraft typically utilize brake systems on wheels to slow or stop the aircraft during landings, taxiing and emergency situations, such as, for example, a rejected take off (RTO), which generally refers to engagement of a brake system during an aborted take off and involves high braking loads over a short time period, resulting in a rapid increase in the brake temperature. The brake systems generally employ a heat sink comprising a series of friction disks, sandwiched between a pressure plate and an end plate, that may be forced into sliding contact with one another during a brake application to slow or stop the aircraft.

A typical hydraulic brake system may include, without limitation, a source of pressurized hydraulic fluid, a hydraulic actuator for exerting a force across the heat sink (e.g., across the pressure plate, the series of friction disks and the end plate), a valve for controlling a pressure level provided to the hydraulic actuator and a brake control unit for receiving inputs from a pilot and from various feedback mechanisms and for producing responsive outputs to the valve. Upon activation of the brake system (e.g., by depressing a brake pedal), a pressurized fluid is applied to the hydraulic actuator, which may comprise a piston configured to translate the pressure plate toward the end plate. A typical electric brake system includes various electromechanical counterparts to a hydraulic brake system, such as, for example, an electromechanical brake actuator (EBA) in place of the hydraulic actuator and a source of electric power in place of the source of pressurized hydraulic fluid.

SUMMARY

A braking system for an aircraft is disclosed herein. The braking system may comprise: a brake assembly; a hydraulic braking subsystem having a hydraulic brake actuator configured to operate the brake assembly; an electric braking subsystem having an electric brake actuator configured to operate the brake assembly; a hydraulic brake control unit configured to operate the hydraulic braking subsystem; and an electric brake control unit configured to operate the electric braking subsystem, the electric brake control unit in operable communication with the hydraulic brake control unit, wherein the braking system is configured to: determine a primary braking system for a prior flight cycle; and activate the electric braking subsystem to be the primary braking system for a current flight cycle in response to determining the hydraulic braking subsystem was the primary braking system for the prior flight cycle.

In various embodiments, only the primary braking system is configured to operate the brake assembly for a flight cycle.

In various embodiments, the electric brake control unit and the hydraulic brake control unit are both configured to receive an indication that the braking system has been powered up prior to determining the primary braking system for the prior flight cycle.

In various embodiments, the electric brake control unit is configured to command the hydraulic brake control unit to be the primary braking system for the current flight cycle in response to determining the electric braking subsystem was the primary braking system for the prior flight cycle.

In various embodiments, the primary braking system is further configured to: determine a take off phase of the current flight cycle; and activate a secondary braking system for potential use during the take off phase of the current flight cycle. The primary braking system may be further configured to determine a rejected take off (RTO) phase of the current flight cycle. The primary braking system may be further configured to command the hydraulic braking subsystem and the electric braking subsystem to operate the brake assembly in response to determining the RTO phase of the current flight cycle. The primary braking system may be further configured to command only the primary braking system to operate the brake assembly during the RTO phase of the current flight cycle. The primary braking system may be further configured to determine a failure of the primary braking system during the RTO phase of the current flight cycle. The primary braking system may be further configured to command the secondary braking system to take over braking controls in response to determining the failure of the primary braking system.

An article of manufacture is disclosed herein. The article of manufacture may include a tangible, non-transitory computer-readable storage medium having instructions stored thereon that, in response to execution by a processor, cause the processor to perform operations comprising: determining, by the processor, a take off phase of a flight for an aircraft; activating, by the processor, a secondary braking system of a braking system for possible use during the take off phase of the flight, the secondary braking system configured to operate independently from a primary braking system; determining, by the processor, a rejected take off (RTO) phase of the flight; and commanding, by the processor, braking of a brake assembly by the primary braking system and the secondary braking system during the RTO phase of the flight.

In various embodiments, the primary braking system is a hydraulic braking system and the secondary braking system is an electric braking system.

In various embodiments, the primary braking system is an electric braking system and the secondary braking system is a hydraulic braking system.

In various embodiments, the operations further comprise determining, via the processor, a selected primary braking system for a prior flight during a powering up of the processor. The operations may further comprise selecting, via the processor, the primary braking system for the flight based on the selected primary braking system for the prior flight, the selected primary braking system for the prior flight being the secondary braking system for the flight.

An article of manufacture is disclosed herein. The article of manufacture may include a tangible, non-transitory computer-readable storage medium having instructions stored thereon that, in response to execution by a processor, cause the processor to perform operations comprising: determining, by the processor, a take off phase of a flight for an aircraft; activating, by the processor, a secondary braking system of a braking system for possible use during the take off phase of the flight, the secondary braking system configured to operate independently from a primary braking system; determining, by the processor, a rejected take off (RTO) phase of the flight; and commanding, by the processor, braking via the primary braking system only during the RTO phase of the flight.

In various embodiments, the operations further comprise: determining, via the processor, a failure of the primary braking system; and commanding, via the processor, braking via the secondary braking system only. The operations may further comprise determining, via the processor, a selected primary braking system for a prior flight during a powering up of the processor. The operations may further comprise selecting, via the processor, the primary braking system for the flight based on the selected primary braking system for the prior flight, the selected primary braking system for the prior flight being the secondary braking system for the flight.

In various embodiments, the primary braking system is an electric braking subsystem of the braking system or a hydraulic braking subsystem of the braking system, and wherein the secondary braking system is the hydraulic braking subsystem in response to the electric braking subsystem being the primary braking system.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Methods for avoiding latent brake failure, as well as methods of mitigating latent brake failure, are disclosed herein.

Figure 1A:
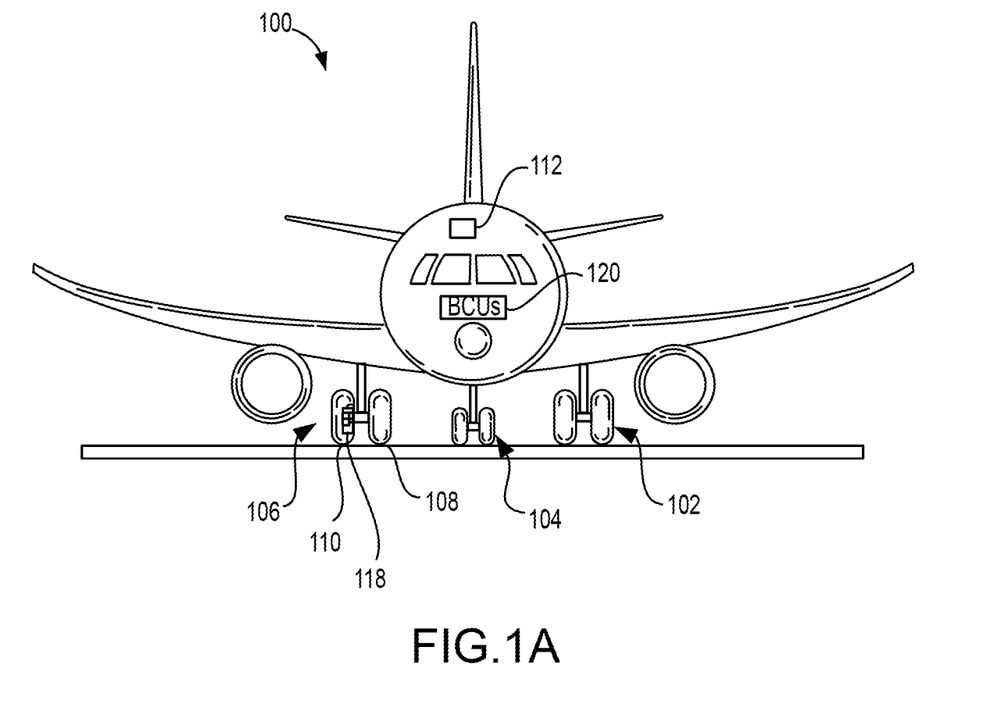
FIG. 1A illustrates an aircraft having multiple landing gear and brakes, in accordance with various embodiments.

Referring now to FIG. 1A, an aircraft 100 includes multiple landing gear systems, including a first landing gear 102 (or a port-side landing gear), a second landing gear 104 (or a nose landing gear) and a third landing gear 106 (or a starboard-side landing gear). The first landing gear 102, the second landing gear 104 and the third landing gear 106 each include one or more wheel assemblies. For example, the third landing gear 106 includes an inner wheel assembly 108 and an outer wheel assembly 110. The first landing gear 102, the second landing gear 104 and the third landing gear 106 support the aircraft 100 when the aircraft 100 is not flying, thereby enabling the aircraft 100 to take off, land and taxi without incurring damage. In various embodiments, one or more of the first landing gear 102, the second landing gear 104 and the third landing gear 106 is operationally retractable into the aircraft 100 while the aircraft 100 is in flight.

In various embodiments, the aircraft 100 further includes an avionics unit 112, which includes one or more controllers (e.g., processors) and one or more tangible, non-transitory memories capable of implementing digital or programmatic logic. In various embodiments, for example, the one or more controllers are one or more of a general purpose processor, digital signal processor (DSP), application specific integrated circuit (ASIC), field programmable gate array (FPGA) or other programmable logic device, discrete gate, transistor logic, or discrete hardware component, or any of various combinations thereof or the like. In various embodiments, the avionics unit 112 controls operation of various components of the aircraft 100. For example, the avionics unit 112 controls various parameters of flight, such as an air traffic management systems, auto-pilot systems, auto-thrust systems, crew alerting systems, electrical systems, electronic checklist systems, electronic flight bag systems, engine systems flight control systems, environmental systems, hydraulics systems, lighting systems, pneumatics systems, traffic avoidance systems, trim systems, brake systems and the like.

Figure 1B:
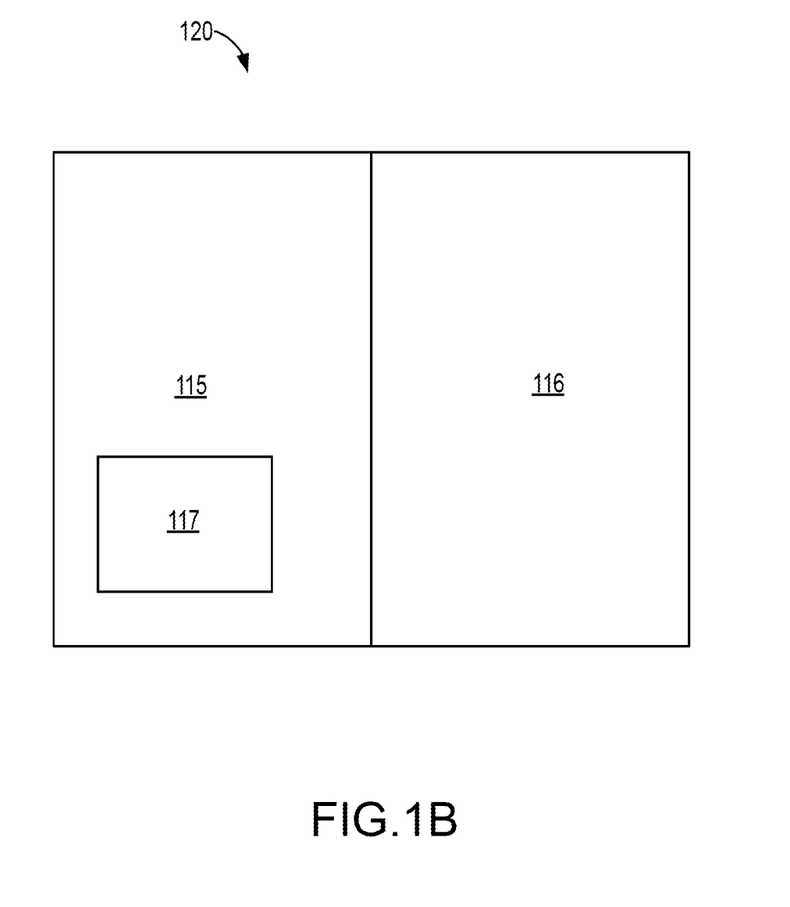
FIG. 1B is a block diagram of a brake control unit, in accordance with various embodiments.

In various embodiments, the aircraft 100 further includes brake control units (BCUs) 120 (e.g., hydraulic brake control unit 220 and electric brake control unit 250 as described further herein). With brief reference now to FIG. 1B, the BCUs 120 include one or more controllers 115 (e.g., processors) and one or more memories 116 (e.g., tangible, non-transitory memories) capable of implementing digital or programable logic. In various embodiments, for example, the one or more controllers 115 is one or more of a general purpose processor, DSP, ASIC, FPGA, or other programmable logic device, discrete gate, transistor logic, or discrete hardware component, or any of various combinations thereof or the like, and the one or more memories 116 is configured to store instructions that are implemented by the one or more controllers 115 for performing various functions, such as adjusting the hydraulic pressure or electric power provided to a brake actuator depending on the degree of braking desired. In various embodiments, the BCUs 120 control the braking of the aircraft 100. For example, the BCUs 120 control various parameters of braking, such as manual brake control, automatic brake control, antiskid braking, locked wheel protection, touchdown protection, emergency/parking brake monitoring or gear retraction braking. The BCUs 120 may further include hardware 117 capable of performing various logic using discrete power signals received from various aircraft systems. Referring again to FIG. 1A, the aircraft 100 further includes one or more brake assemblies coupled to each wheel assembly. For example, a brake assembly 118 is coupled to the outer wheel assembly 110 of the third landing gear 106 of the aircraft 100. During operation, the brake assembly 118 applies a braking force to the outer wheel assembly 110 upon receiving a brake command from the BCUs 120. In various embodiments, the outer wheel assembly 110 of the third landing gear 106 of the aircraft 100 (or of any of the other landing gear described above and herein) comprises any number of wheels or brake assemblies.

Figure 1C:
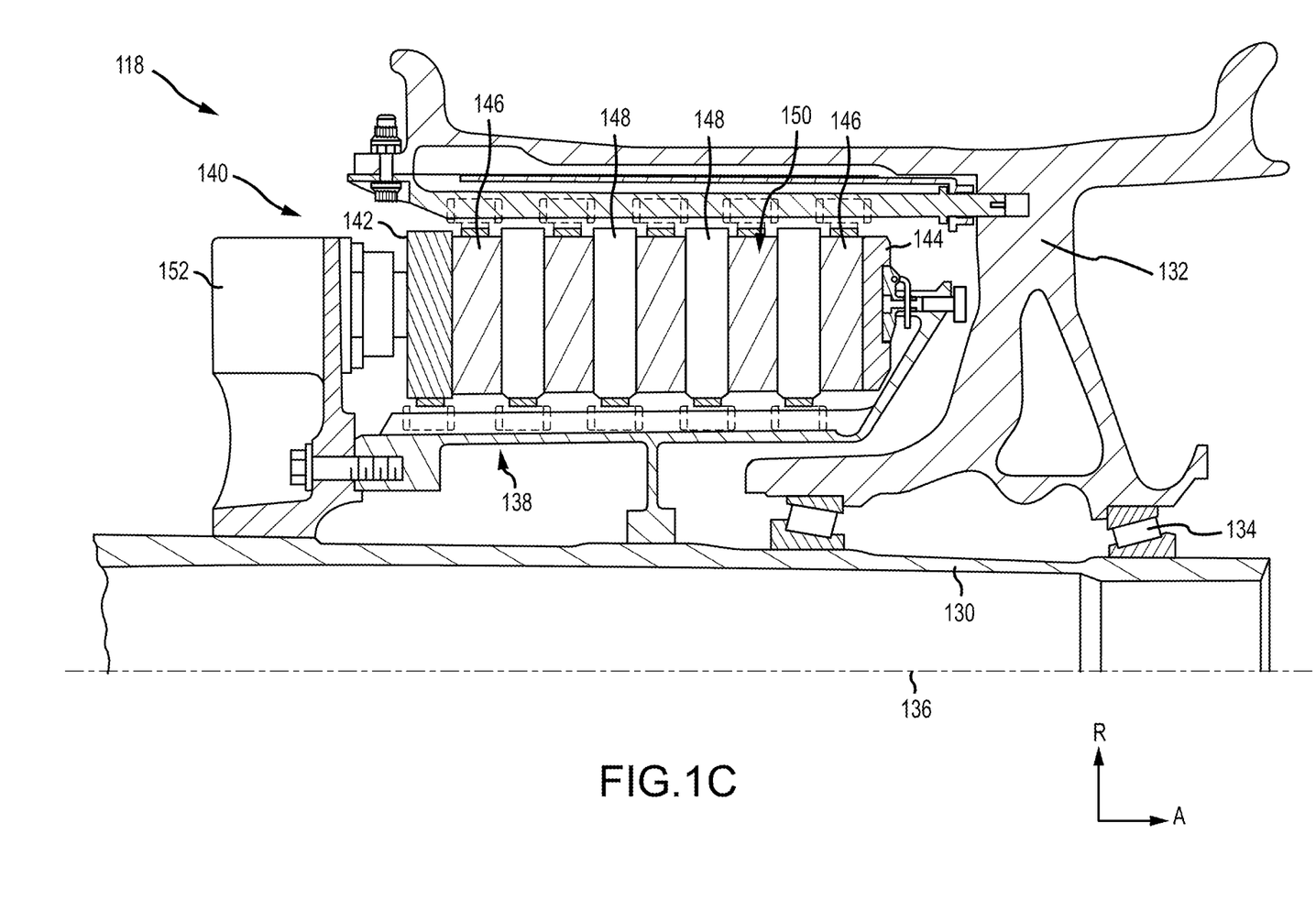
FIG. 1C is a schematic diagram of a brake assembly, in accordance with various embodiments.

Referring now to FIG. 1C, schematic details of the brake assembly 118 illustrated in FIG. 1A are provided. In various embodiments, the brake assembly 118 is mounted on an axle 130 for use with a wheel 132 disposed on and configured to rotate about the axle 130 via one or more bearing assemblies 134. A central axis 136 extends through the axle 130 and defines a center of rotation of the wheel 132. A torque plate barrel 138 (sometimes referred to as a torque tube or barrel or a torque plate) is aligned concentrically with the central axis 136, and the wheel 132 is rotatable relative to the torque plate barrel 138. The brake assembly 118 includes an actuator ram assembly 140, a pressure plate 142 disposed adjacent the actuator ram assembly 140, an end plate 144 positioned a distal location from the actuator ram assembly 140, and a plurality of rotor disks 146 interleaved with a plurality of stator disks 148 positioned intermediate the pressure plate 142 and the end plate 144. The pressure plate 142, the plurality of rotor disks 146, the plurality of stator disks 148 and the end plate 144 together form a brake heat sink or brake stack 150. The pressure plate 142, the end plate 144 and the plurality of stator disks 148 are mounted to the torque plate barrel 138 and remain rotationally stationary relative to the axle 130. The plurality of rotor disks 146 is mounted to the wheel 132 and rotate with respect to each of the pressure plate 142, the end plate 144 and the plurality of stator disks 148.

An actuating mechanism for the brake assembly 118 includes a plurality of actuator ram assemblies, including the actuator ram assembly 140, circumferentially spaced around a piston housing 152 (only one actuator ram assembly is illustrated in FIG. 1C). Upon actuation, the plurality of actuator ram assemblies affects a braking action by urging the pressure plate 142 and the plurality of stator disks 148 into frictional engagement with the plurality of rotor disks 146 and against the end plate 144. Through compression of the plurality of rotor disks 146 and the plurality of stator disks 148 between the pressure plate 142 and the end plate 144, the resulting frictional contact slows or stops or otherwise prevents rotation of the wheel 132. In various embodiments, the plurality of rotor disks 146 and the plurality of stator disks 148 are fabricated from various materials, such as, for example, ceramic matrix composite materials, that enable the brake disks to withstand and dissipate the heat generated during and following a braking action. As discussed in further detail below, in various embodiments, the actuator ram assemblies comprise a combination of electrically operated actuator rams (or electric brake actuators) and hydraulically operated actuator rams (or hydraulic brake actuators).

Figure 2A:
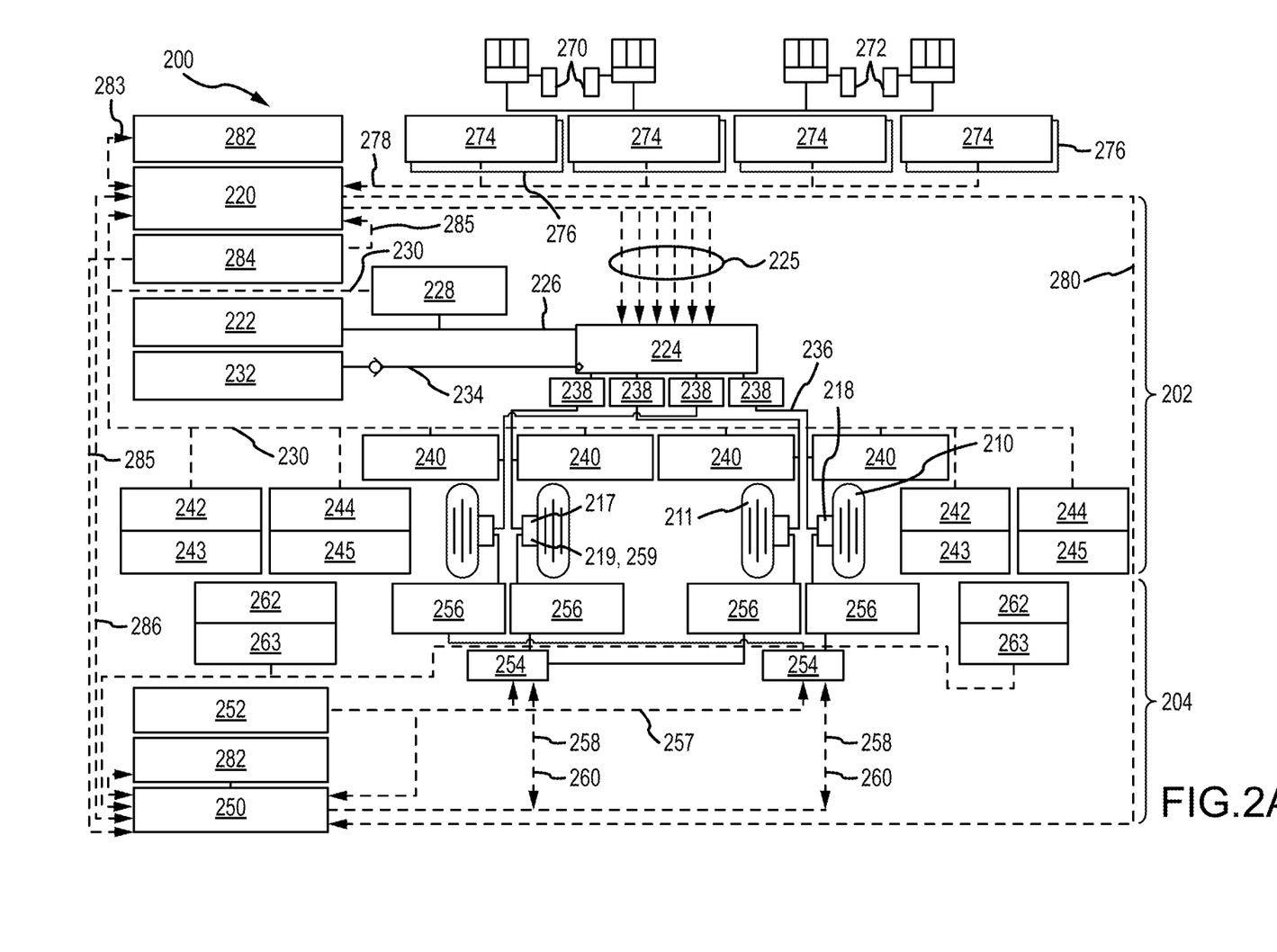
FIGS. 2A and 2B are functional diagrams of a hybrid or redundant braking system, in accordance with various embodiments.

Referring now to FIG. 2A, a braking system 200 (or a redundant braking system or a hybrid braking system) is illustrated, in accordance with various embodiments. Generally, the braking system 200 may be separated into a hydraulic braking subsystem 202 and an electric braking subsystem 204. Referring first to the hydraulic braking subsystem 202, the braking system 200 includes a hydraulic brake control unit 220, which is programmed to control the various braking functions performed by the hydraulic braking subsystem 202. The hydraulic braking subsystem 202 includes a hydraulic power source 222 configured to provide a hydraulic fluid to a primary brake control module 224 via a primary hydraulic line 226. A primary pressure transducer 228 senses the pressure of the hydraulic fluid and provides a signal reflective of the pressure to the hydraulic brake control unit 220 via a data circuit 230. In various embodiments, the hydraulic braking subsystem 202 includes a hydraulic fluid return 232 that is configured to return hydraulic fluid from the primary brake control module 224 to the hydraulic power source 222 via a return hydraulic line 234.

A secondary hydraulic line 236 fluidly couples the primary brake control module 224 to a brake assembly 218, similar to the brake assembly 118 described above with reference to FIG. 1A. More particularly, the secondary hydraulic line 236 is fluidly coupled to a hydraulic brake actuator 217 (or a plurality of hydraulic brake actuators) housed within the brake assembly 218. In various embodiments, a fuse 238 is fluidly coupled to the secondary hydraulic line 236 downstream of the primary brake control module 224. The fuse 238 acts as a shut-off valve or switch in the event the secondary hydraulic line 236 experiences a loss of pressure—e.g., in the event of a leak in the secondary hydraulic line 236 or the brake assembly 218—thereby preventing hydraulic fluid from continuing to flow to the secondary hydraulic line 236 and leaking out of the hydraulic system. A secondary pressure transducer 240 is fluidly coupled to the secondary hydraulic line 236 and electrically coupled to the hydraulic brake control unit 220 via the data circuit 230. In the event the secondary pressure transducer 240 senses a loss of pressure within the secondary hydraulic line 236, the hydraulic brake control unit 220 may, in redundant fashion, pass control of the braking system 200 to the electric braking subsystem 204. As illustrated, the secondary hydraulic line 236, the fuse 238, the secondary pressure transducer 240 and the brake assembly 218 are replicated for each of a plurality of outer wheel assemblies 210 and for each of a plurality of inner wheel assemblies 211 comprised within the braking system 200. Without loss of generality, in various embodiments, the hydraulic braking subsystem 202 also includes wheel speed transducers and brake temperature sensors, such as, for example, an inboard wheel speed transducer 242 and an outboard wheel speed transducer 243, and an inboard brake temperature sensor 244 and an outboard brake temperature sensor 245.

Referring now to the electric braking subsystem 204, the braking system 200 includes an electric brake control unit 250, which is programmed to control the various braking functions performed by the electric braking subsystem 204. The electric braking subsystem 204 includes an electric power source 252 configured to provide electric power to an electric brake actuator controller 254, which, for example, may be an inboard electric brake actuator controller or an outboard electric brake actuator controller. The electric power is provided to the electric brake actuator controller 254 via an electric power circuit 257. The electric brake actuator controller 254 is electrically coupled to an electric brake actuator 219 (or a plurality of electric brake actuators) that is housed within the brake assembly 218. In various embodiments, the electric brake actuator controller 254 includes or is connected to a control circuitry 256 configured to monitor various aspects of a braking operation. The electric brake actuator 219 may include, for example, a load cell 259 electrically coupled to the control circuitry 256 and configured to monitor the load applied via the electric brake actuator 219. In various embodiments, the electric brake control unit 250 provides force commands to the electric brake controller 254, which in turn provides a current command to the electric brake actuator 219 to apply force, directing the electric brake actuator 219 to cause the brake assembly 218 to mechanically operate, thereby driving the brake assembly 218 to provide braking power. In various embodiments, the brake actuator controller 254 monitors the load cell 259 (e.g., via the control circuitry 256) to apply more or less current to achieve a desired force. In various embodiments, the electric brake actuator controller 254 is coupled to the electric brake control unit 250 via a communication link 258. The communication link 258 may comprise, for example, a controller area network bus 260. Similar to the hydraulic braking subsystem 202, and without loss of generality, the electric braking subsystem 204 also includes wheel speed transducers, such as, for example, an inboard wheel speed transducer 262 and an outboard wheel speed transducer 263, or brake temperature sensors.

Figure 2B:
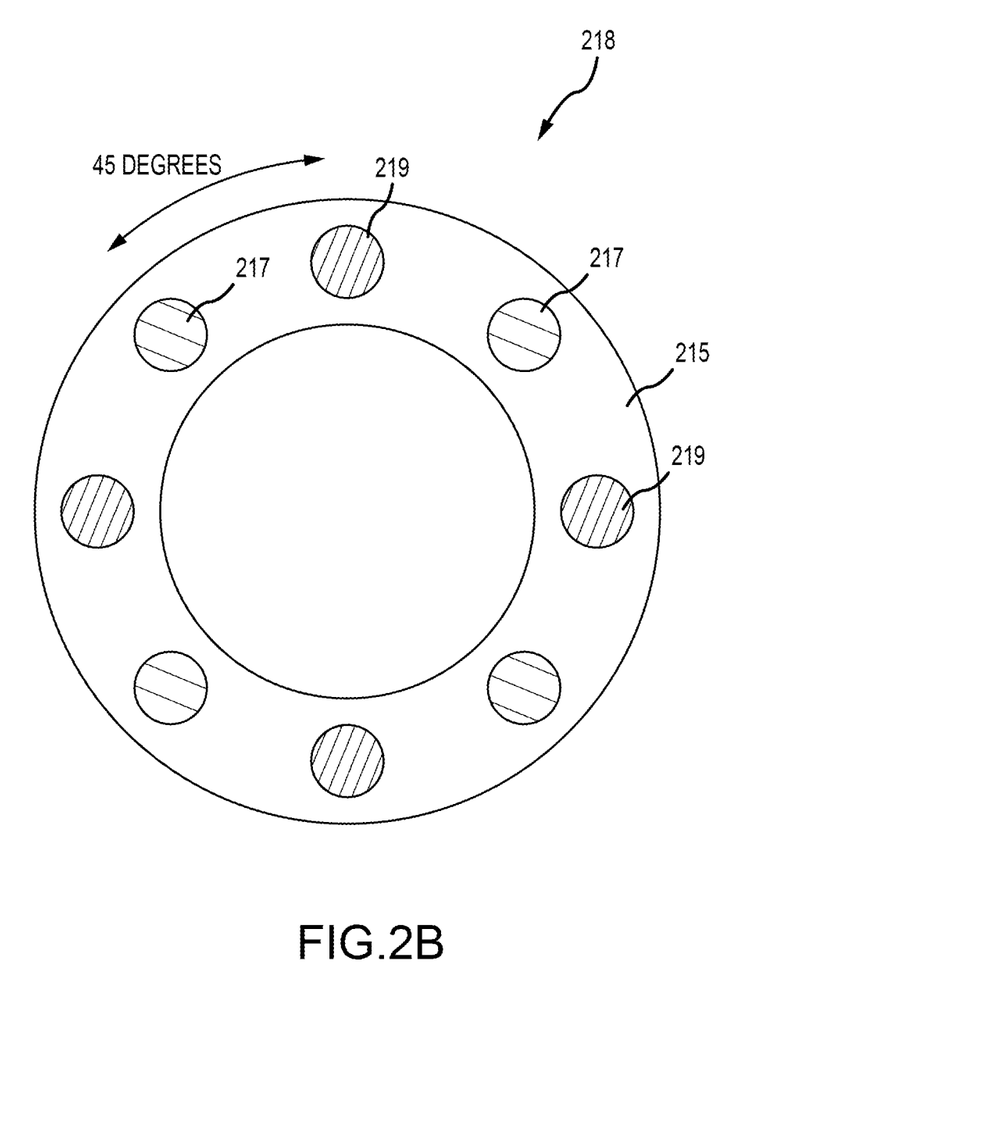

Referring now to FIG. 2B, the brake assembly 218 is described with further detail. As illustrated, the brake assembly 218 includes a pressure plate 215 configured to apply a compressive load against a brake stack or heat sink, which includes a plurality of brake rotors and a plurality of brake stators sandwiched between the pressure plate and an end plate. As described above, the brake assembly 218 includes the hydraulic brake actuator 217 (or a plurality of such hydraulic brake actuators) and the electric brake actuator 219 (or a plurality of such electric brake actuators). In various embodiments, the brake assembly 218 includes four electric brake actuators spaced at ninety degree (90°) intervals about the pressure plate 215 and four hydraulic brake actuators spaced at ninety degree (90°) intervals about the pressure plate 215, with each electric brake actuator and each hydraulic brake actuator spaced at forty-five degree (45°) intervals. Fewer or greater numbers of actuators, both electric and hydraulic, are contemplated within the scope of the disclosure.

Referring back to FIG. 2A, during operation, a pilot or a co-pilot depresses a pilot brake pedal 270 or a co-pilot brake pedal 272, each of which is connected to a hydraulic brake position sensor 274 and to an electric brake position sensor 276. The hydraulic brake position sensor 274 generates a signal reflective of the pedal position that is transmitted to the hydraulic brake control unit 220 via a hydraulic brake sensor bus 278. The hydraulic brake control unit 220, if employed, then activates the hydraulic brake actuator 217 based on a current signal that is transmitted to the primary brake control module 224 via a primary brake control bus 225. Similarly, the electric brake position sensor 276 generates a signal reflective of the pedal position that is transmitted to the electric brake control unit 250 via an electric brake sensor bus 280. The electric brake control unit 250, if employed, then activates the electric brake actuator 219 based on a force request that is transmitted to the electric brake actuator controller 254 via the communication link 258. In various embodiments, an avionics system 282 is configured to employ one or both of the hydraulic braking subsystem 202 and the electric braking subsystem 204 via signals transmitted over a respective data bus 283. In various embodiments, an autobrake selector 284 is configured to employ one or both of the hydraulic braking subsystem 202 and the electric braking subsystem 204 via signals transmitted over an autobrake data bus 285.

The braking system 200 may operate in a fully hydraulic mode, employing only the hydraulic braking subsystem 202, or in a fully electric mode, employing only the electric braking subsystem 204. In addition, the disclosure contemplates, in various embodiments, the hydraulic braking subsystem 202 being employed as the principal braking system, while the electric braking subsystem 204 is employed as a backup braking system in the event a failure occurs with the hydraulic braking subsystem 202. The disclosure also contemplates, in various embodiments, the electric braking subsystem 204 being employed as a parking brake when the aircraft is at rest. In various embodiments, the hydraulic brake control unit 220 and the electric brake control unit 250 are configured to communicate with one another via an intercommunication bus 286. Such communication enables, for example, transfer of control from the hydraulic brake control unit 220 to the electric brake control unit 250 following a failure of the hydraulic braking subsystem 202. For example, in the event the hydraulic brake control unit 220 detects a leak of hydraulic fluid within the hydraulic braking subsystem 202, the hydraulic brake control unit 220 may communicate with the electric brake control unit 250 and transfer control of the braking system 200 to the electric brake control unit 250. Similarly, in the event the electric brake control unit 250 detects a failure within the electric braking subsystem 204, the electric brake control unit 250 may communicate with the hydraulic brake control unit 220 and transfer control of the braking system 200 to the hydraulic brake control unit 220. In this regard, a primary braking system and a secondary braking system may be determined for each flight cycle, as described further herein. Based on a failure to the primary braking system being detected, the BCUs 120 are configured to transfer control from the primary braking system to the secondary braking system.

The above disclosure provides for a hybrid braking architecture. In various embodiments, the architecture employs hydraulic power for normal braking and electric power for an alternate braking system or a parking brake system. The architecture provides a fully redundant braking system for normal pedal operated braking and for emergency braking. In various embodiments, the piston housing (e.g., the piston housing 152 referred to in FIG. 1C) is modified to accept four hydraulic actuators and four electric actuators, spaced equally and alternating between one hydraulic actuator and one electric actuator; though any number of actuators is contemplated by the disclosure. The equal spacing of forty-five degrees (45°) between alternating hydraulic and electric brake actuators allows for uniform force application on the brake stack when the hydraulic system is active or the electric system is active.

In various embodiments, the architecture is operated using pedals in the cockpit. This allows seamless activity and minimum pilot effort when, for example, the emergency system is engaged. The architecture is transparent for actuation (e.g., automated), although crew-alerting system (CAS) messages may be employed to inform the pilot that the emergency system (e.g., the electric braking subsystem) has become active. The hydraulic and electric brake control units are in constant communication using, for example, controller area network (CAN) communication links, such that when the primary brake control unit (either the hydraulic or the electric brake control unit) detects a loss of braking or other fault, the alternate brake control unit (either the hydraulic or the electric brake control unit) may take over control and operate the braking. In various embodiments, a switch may also be provided in the cockpit to allow the pilot to manually switch from the one braking subsystem to the other—e.g., the hydraulic subsystem to the electric sub system—depending on the failure and any other issues or faults occurring with the power supplies or other aircraft system degradations.

Figure 3:
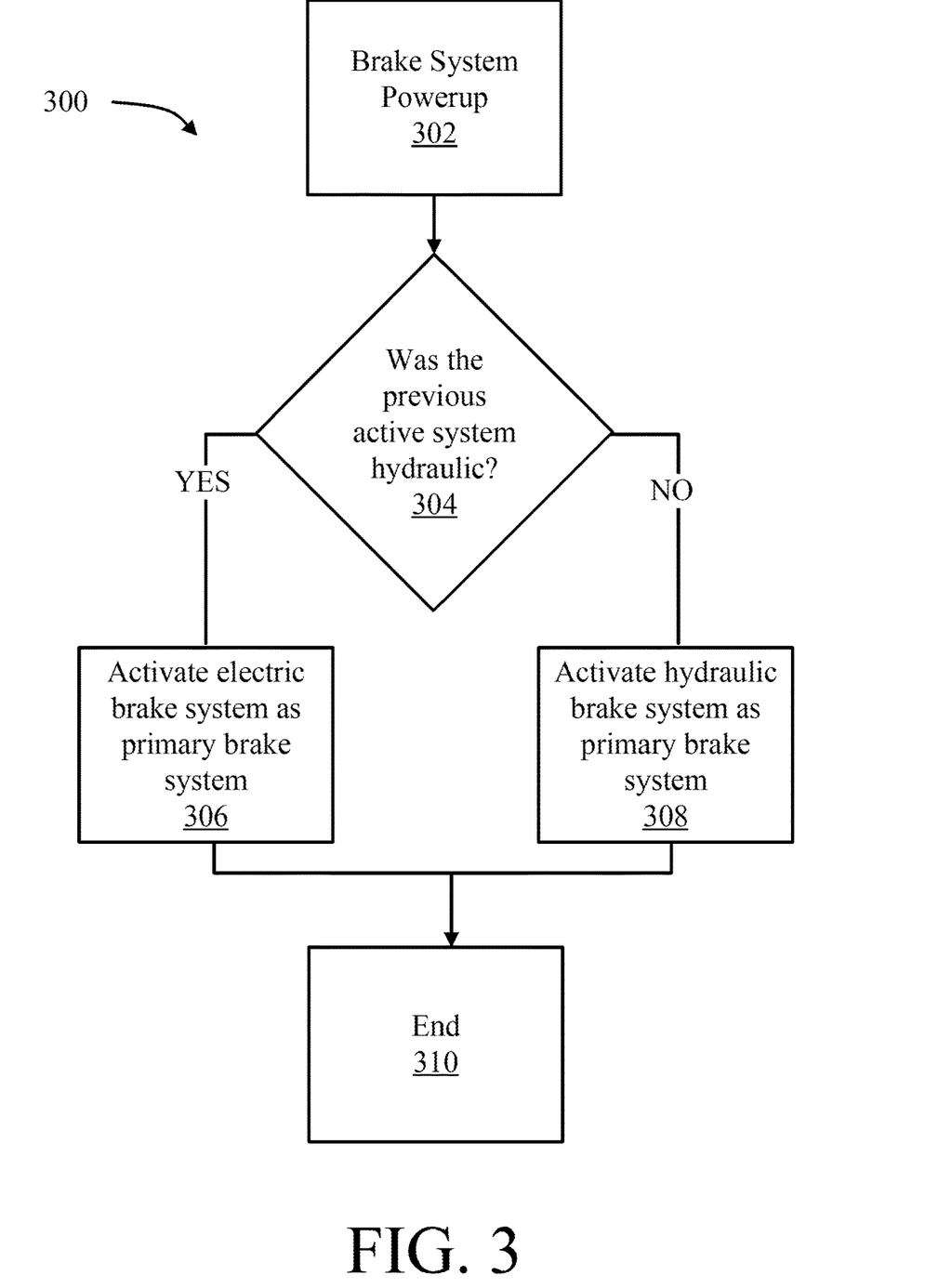
FIG. 3 illustrates a process for operating the hybrid or redundant braking system, in accordance with various embodiments.

Referring now to FIG. 3, a process 300 for operating the braking system 200 is described, in accordance with various embodiments. The process 300 starts in response to the braking system 200 powering up (block 302). Once an aircraft 100 is parked at a gate, and a parking brake is set, aircraft engines, and the BCUs 120 may be powered down. Once the aircraft 100 is loaded with passengers and all maintenance checks have been performed, a pilot turns back on the BCUs 120 and the aircraft engines. In response to powering up the braking system 200 via the BCUs 120 (i.e., the hydraulic brake control unit 220 and the electric brake control unit 250), the process 300 is initiated.

The process 300 further comprises determining which brake subsystem (e.g., hydraulic braking subsystem 202 or electric braking subsystem 204) was active during a prior flight cycle (step 304). Stated another way, the BCUs 120 (i.e., the hydraulic brake control unit 220 and the electric brake control unit 250), prior to powering down a previous flight cycle, store (e.g., in the memory 116) the braking subsystem utilized in the previous flight cycle. Thus, in response to powering up, the BCUs 120 determine if the previous active system was the hydraulic braking subsystem 202 in step 304.

In response to determining the hydraulic braking subsystem 202 was utilized for the previous flight cycle, the BCUs 120 (e.g., via electric brake control unit 250) activate the electric braking subsystem 204 as a primary brake system for a current flight cycle (step 306). Similarly, in response to determining the electric braking subsystem 204 was utilized for the previous flight cycle, the BCUs 120 (e.g., via the hydraulic brake control unit 220) activate the hydraulic braking subsystem 202 for the current flight cycle (step 308). After selecting a primary brake system for sole use during the current flight cycle in step 306 or step 308, the process 300 ends at step 310.

Thus, the process 300 keeps track of which system (e.g., hydraulic braking subsystem 202 or electric braking subsystem 204) was utilized for the previous flight cycle and alternates to the other subsystem for the following flight cycle. In this regard, the process 300 facilitates exercise of both systems (e.g., hydraulic braking subsystem 202 or electric braking subsystem 204) frequently to avoid latent brake failures. The process 300 further allows use of the electric brake actuator 219 half of the time relative to conventional system, thus doubling the life of the electric braking subsystem 204.

Figure 4:
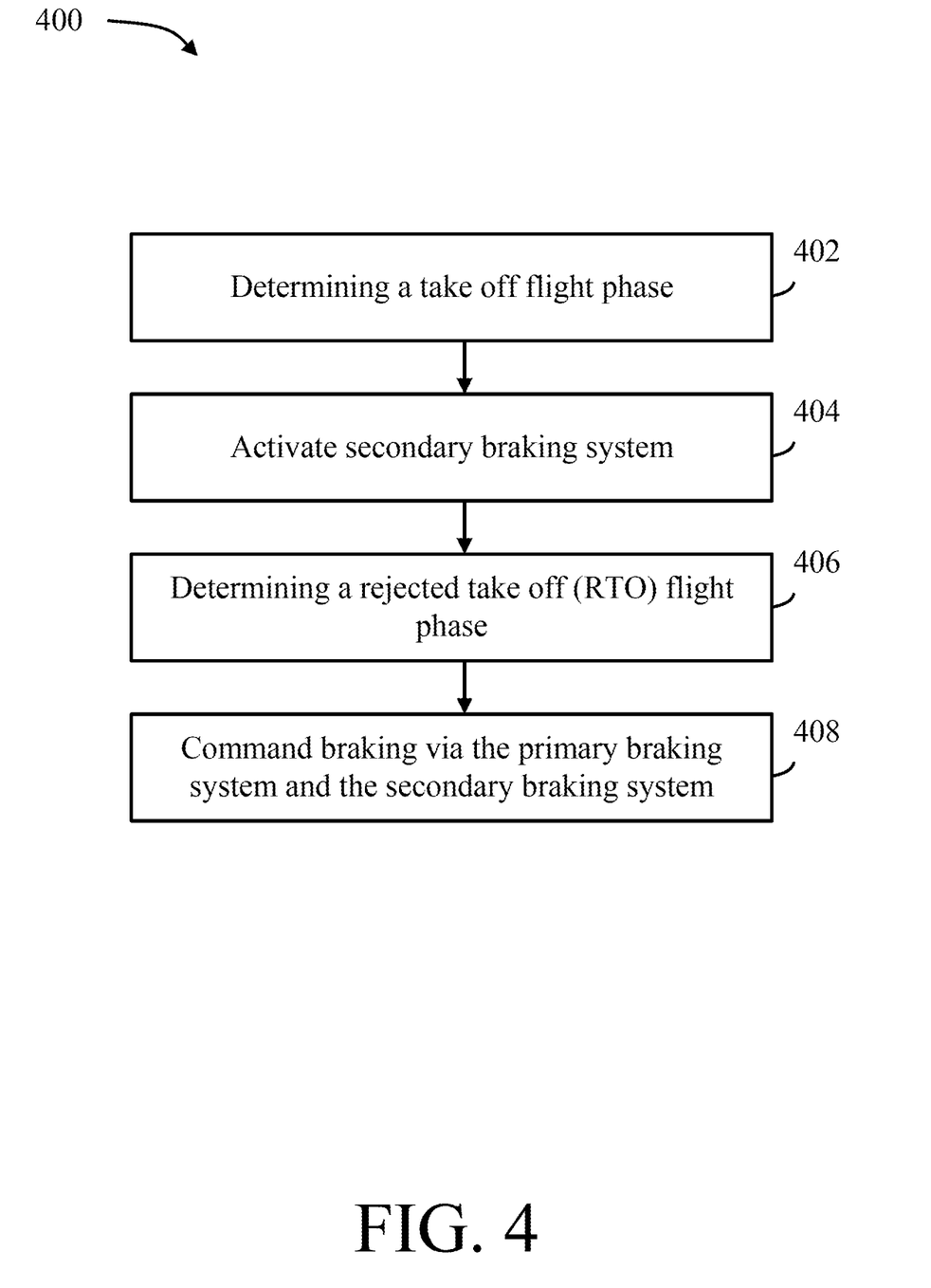
FIG. 4 illustrates a process for operating the hybrid or redundant braking system, in accordance with various embodiments.

Referring now to FIG. 4, a process 400 for operating the braking system 200 with the BCUs 120 during a rejected take off (RTO) phase of flight is illustrated, in accordance with various embodiments. The process 400 comprises determining, via a primary BCU of the BCUs 120 (e.g., the electric brake control unit 250 or the hydraulic brake control unit 220, whichever is a primary brake control unit determined from process 300), an aircraft 100 is in a take off flight phase. The primary BCU may make this determination based on receiving sensor data (e.g., from a weight on wheel sensor, a speed sensor, etc.). For example, the primary BCU may receive data from a weight on wheel sensor indicating wheel 132 has weight on the wheel 132. In this regard, the primary BCU is able to determine the aircraft is on the ground. During take-off, an aircraft 100 has to reach an aircraft velocity to generate enough lift for the aircraft 100 to take off. Thus, in response to the aircraft 100 exceeding a speed threshold and having weight on wheels, the primary BCU is able to determine the aircraft 100 is in a take off flight phase. In various embodiments, the speed threshold for determining a take off phase of flight may be approximately 70 knots. However, the present disclosure is not limited in this regard, and one skilled in the art may recognized various aircraft speed thresholds for determining a take off phase of flight, in accordance with various embodiments.

The process 400 further comprises activating a secondary braking system in response to determining the aircraft 100 is in a take off phase of flight (step 404). In this regard, as indicated in process 300 one of the hydraulic braking subsystem 202 or the electric braking subsystem 204 may be activated as a primary braking system for the flight cycle, and the remaining braking subsystem may be a secondary braking system for the flight cycle. During the take off phase, the secondary braking system may be activated in case the take-off must be aborted.

For example, the process 400 further comprises determining a rejected take off (RTO) flight phase (step 406). In various embodiments, during a rejected take off (RTO) flight phase, a pilot may reduce an engine power provided to engines of the aircraft 100 to idle. In this regard, the primary BCU may receive an indication that the engine power provided to the engines of the aircraft 100 have been reduced to idle, while the aircraft is in a take off phase (e.g., determined from step 402). Thus, the primary BCU may determine, based on a reduction of engine power to idle, that the aircraft 100 is in an RTO phase of flight.

The process 400 further comprises commanding, via the primary BCU, the primary braking system and the secondary braking system to apply braking (step 408). In this regard, the process 400 may facilitate a boost in braking to a maximum potential for the braking system 200 to stop the aircraft 100 as quickly as possible during the RTO phase of flight.

Figure 5:
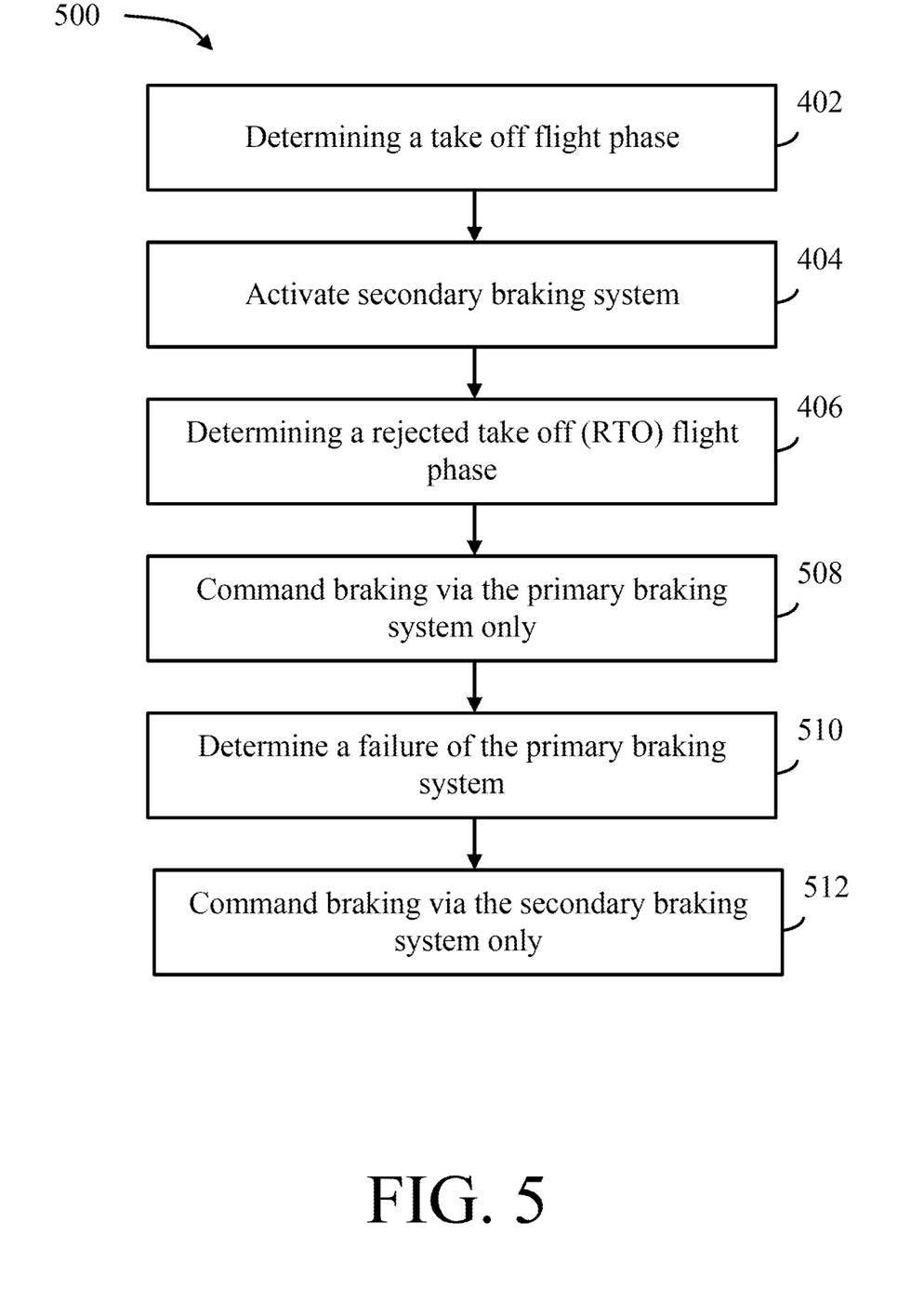
FIG. 5 illustrates a process for operating the hybrid or redundant braking system, in accordance with various embodiments.

Referring now to FIG. 5, a process 500 for operating the braking system 200 with the BCUs 120 during a rejected take off (RTO) phase of flight is illustrated, in accordance with various embodiments. The process 500 includes steps 402, 404, and 406 of process 400. However, the process 500 further comprises commanding braking via the primary braking system (e.g., hydraulic braking subsystem 202 or electric braking subsystem 204 selected from process 300 of FIG. 3) only (step 508). In this regard, the process 500 may continue to operate in accordance with the process 300 (i.e., utilize only a single braking system per flight cycle, including in an RTO event.

In various embodiments, the process 500 further comprises determining, via the primary braking system, a latent failure of the primary braking system (step 510). In various embodiments, the failure may be determined based on the primary BCU receiving a first wheel speed from a first wheel speed sensor, receiving a second wheel speed from a second wheel speed sensor, comparing the first wheel speed to the second wheel speed, and determining the first wheel speed is greater than the second wheel speed by a predetermined threshold. The predetermined threshold may be a wheel speed value or may be an error percentage or any other desired threshold depending on the particular arithmetic function used for detecting difference. The predetermined threshold may be a tunable parameter based upon the particular design of the braking system 200. In various embodiments, the primary BCU may detect that the difference is greater than the predetermined threshold for at least a minimum duration to prevent a false alarm in response to a brief anomaly, such as a brief skid event for example. In various embodiments, the minimum duration is on the order of milliseconds. In various embodiments, the minimum duration is on the order of seconds. However, the minimum duration may be chosen to be any suitable duration that would indicate a high likelihood of a failed brake component.

In various embodiments, in response to determine the latent failure of the primary braking system in step 510, the process 500 further comprises commanding braking via the secondary braking system (step 512). In this regard, consistent braking may be applied to each wheel 132 on each main landing gear (e.g., first landing gear 102 and third landing gear 106) during a RTO event, irrespective of a latent failure occurring in the primary braking system, in accordance with various embodiments.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A braking system for an aircraft, comprising:
   a brake assembly;
   a hydraulic braking subsystem having a hydraulic brake actuator configured to operate the brake assembly;
   an electric braking subsystem having an electric brake actuator configured to operate the brake assembly;
   a hydraulic brake control unit configured to operate the hydraulic braking subsystem; and
   an electric brake control unit configured to operate the electric braking subsystem, the electric brake control unit in operable communication with the hydraulic brake control unit, wherein the braking system is configured to:
   determine a primary braking system for a prior flight cycle; and
   activate the electric braking subsystem to be the primary braking system for a current flight cycle in response to determining the hydraulic braking subsystem was the primary braking system for the prior flight cycle.

2. The braking system of claim 1, wherein only the primary braking system is configured to operate the brake assembly for a flight cycle.

3. The braking system of claim 1, wherein the electric brake control unit and the hydraulic brake control unit are both configured to receive an indication that the braking system has been powered up prior to determining the primary braking system for the prior flight cycle.

4. The braking system of claim 1, wherein the electric brake control unit is configured to command the hydraulic brake control unit to be the primary braking system for the current flight cycle in response to determining the electric braking subsystem was the primary braking system for the prior flight cycle.

5. The braking system of claim 1, wherein the primary braking system is further configured to:
determine a take off phase of the current flight cycle; and
activate a secondary braking system for potential use during the take off phase of the current flight cycle.

6. The braking system of claim 5, wherein the primary braking system is further configured to determine a rejected take off (RTO) phase of the current flight cycle.

7. The braking system of claim 6, wherein the primary braking system is further configured to command the hydraulic braking subsystem and the electric braking subsystem to operate the brake assembly in response to determining the RTO phase of the current flight cycle.

8. The braking system of claim 6, wherein the primary braking system is further configured to command only the primary braking system to operate the brake assembly during the RTO phase of the current flight cycle.

9. The braking system of claim 8, wherein the primary braking system is further configured to determine a failure of the primary braking system during the RTO phase of the current flight cycle.

10. The braking system of claim 9, wherein the primary braking system is further configured to command the secondary braking system to take over braking controls in response to determining the failure of the primary braking system.

11. An article of manufacture including a tangible, non-transitory computer-readable storage medium having instructions stored thereon that, in response to execution by a processor, cause the processor to perform operations comprising:
determining, by the processor, a take off phase of a flight for an aircraft;
activating, by the processor, a secondary braking system of a braking system for possible use during the take off phase of the flight, the secondary braking system configured to operate independently from a primary braking system;
determining, by the processor, a rejected take off (RTO) phase of the flight; and
commanding, by the processor, braking of a brake assembly by the primary braking system and the secondary braking system during the RTO phase of the flight.

12. The article of manufacture of claim 11, wherein the primary braking system is a hydraulic braking system and the secondary braking system is an electric braking system.

13. The article of manufacture of claim 11, wherein the primary braking system is an electric braking system and the secondary braking system is a hydraulic braking system.

14. The article of manufacture of claim 11, wherein the operations further comprise determining, via the processor, a selected primary braking system for a prior flight during a powering up of the processor.

15. The article of manufacture of claim 14, wherein the operations further comprise selecting, via the processor, the primary braking system for the flight based on the selected primary braking system for the prior flight, the selected primary braking system for the prior flight being the secondary braking system for the flight.

16. An article of manufacture including a tangible, non-transitory computer-readable storage medium having instructions stored thereon that, in response to execution by a processor, cause the processor to perform operations comprising:
determining, by the processor, a take off phase of a flight for an aircraft;
activating, by the processor, a secondary braking system of a braking system for possible use during the take off phase of the flight, the secondary braking system configured to operate independently from a primary braking system;
determining, by the processor, a rejected take off (RTO) phase of the flight; and
commanding, by the processor, braking via the primary braking system only during the RTO phase of the flight.

17. The article of manufacture of claim 16, wherein the operations further comprise:
determining, via the processor, a failure of the primary braking system; and
commanding, via the processor, braking via the secondary braking system only.

18. The article of manufacture of claim 17, wherein the operations further comprise determining, via the processor, a selected primary braking system for a prior flight during a powering up of the processor.

19. The article of manufacture of claim 18, wherein the operations further comprise selecting, via the processor, the primary braking system for the flight based on the selected primary braking system for the prior flight, the selected primary braking system for the prior flight being the secondary braking system for the flight.

20. The article of manufacture of claim 16, wherein the primary braking system is an electric braking subsystem of the braking system or a hydraulic braking subsystem of the braking system, and wherein the secondary braking system is the hydraulic braking subsystem in response to the electric braking subsystem being the primary braking system.

* * * * *